(12) United States Patent
Jess et al.

(10) Patent No.: US 8,731,790 B2
(45) Date of Patent: May 20, 2014

(54) TORQUE CONTROL SYSTEM AND METHOD FOR SHIFT ASSIST

(75) Inventors: Richard B. Jess, Haslett, MI (US); Stephen Lewis Pudvay, Howell, MI (US); Pascal Tissot, Gerstheim (FR); Vincent Holtz, Rosheim (FR); Christopher J. Trush, Novi, MI (US); Timothy J. Hartrey, Brighton, MI (US)

(73) Assignee: GM Global Technology Operations LLC

( * ) Notice: Subject to any disclaimer, the term of this patent is extended or adjusted under 35 U.S.C. 154(b) by 720 days.

(21) Appl. No.: 12/952,351

(22) Filed: Nov. 23, 2010

(65) Prior Publication Data

US 2012/0130609 A1  May 24, 2012

(51) Int. Cl.
*G06F 17/00* (2006.01)

(52) U.S. Cl.
USPC .................. 701/54; 701/51; 701/53; 701/99; 701/101

(58) Field of Classification Search
USPC ............ 701/54, 51, 55, 22, 67, 68, 102, 103, 701/113, 36, 59, 60, 101, 105, 108, 110, 701/112, 58, 61, 93, 99; 903/945, 930, 946, 903/902, 912; 123/179.16, 406.19, 438, 123/445; 477/109, 176, 107, 3, 102, 111, 477/115, 149, 174, 83, 86, 90
See application file for complete search history.

(56) References Cited

U.S. PATENT DOCUMENTS

| | | | | |
|---|---|---|---|---|
| 5,179,875 A * | 1/1993 | Brown | ............................ | 477/154 |
| 6,223,592 B1 * | 5/2001 | Genise | ......................... | 73/115.02 |
| 7,143,314 B2 * | 11/2006 | Costin | .......................... | 714/38.13 |
| 7,366,597 B2 * | 4/2008 | Hartrey et al. | ................ | 701/32.7 |
| 7,599,780 B2 | 10/2009 | Whitney | | |
| 8,234,049 B2 | 7/2012 | Stempnik | | |
| 8,396,634 B2 * | 3/2013 | Heap et al. | ........................ | 701/55 |
| 8,550,054 B2 | 10/2013 | Kociba | | |
| 2006/0058937 A1 * | 3/2006 | Takebayashi et al. | ........... | 701/51 |
| 2006/0080020 A1 * | 4/2006 | Iriyama et al. | ................... | 701/54 |
| 2007/0221462 A1 * | 9/2007 | Rains | ............................... | 192/3.3 |
| 2009/0118930 A1 * | 5/2009 | Heap et al. | ........................ | 701/54 |
| 2009/0118936 A1 * | 5/2009 | Heap et al. | ........................ | 701/54 |
| 2009/0234545 A1 | 9/2009 | Stempnik | | |
| 2009/0299602 A1 * | 12/2009 | Hartrey et al. | ................. | 701/102 |
| 2010/0250074 A1 | 9/2010 | Hirasako et al. | | |

FOREIGN PATENT DOCUMENTS

| | | |
|---|---|---|
| DE | 102006046164 A1 | 4/2008 |
| DE | 102009000250 A1 | 7/2010 |

OTHER PUBLICATIONS

Office Action dated Jul. 23, 2012 from the German Patent Office for German Patent Application No. 10 2011 118 887.1; 14 pages.

* cited by examiner

*Primary Examiner* — Helal A Algahaim
*Assistant Examiner* — Genna Mott

(57) ABSTRACT

A control system includes a shift detection module, a request generation module, and a request setting module. The shift detection module detects when a transmission is executing a shift. The request generation module generates a transmission torque request to cause an engine to increase a transmission input shaft speed to a desired speed at a desired gear ratio when the transmission is executing the shift. The request setting module selectively sets the transmission torque request equal to a default torque request when the transmission torque request is greater than a first torque and the engine is coupled to a drive wheel.

20 Claims, 4 Drawing Sheets

TORQUE CONTROL SYSTEM AND METHOD FOR SHIFT ASSIST

FIELD

The present disclosure relates to torque control systems, and more particularly, to torque control systems that control a powertrain output torque to improve the speed and the quality or feel of a transmission shift.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts the throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Powertrain control systems have been developed to control the output torque of an engine and/or an electric motor to achieve a desired torque. Other vehicle systems, such as a transmission control system, may request that the powertrain produce torque in excess of torque requested by a driver of the vehicle. For example, the excess torque may be used to eliminate dragging of a wheel of the vehicle, increase vehicle traction, increase vehicle stability, smooth a gear shift, and/or for any other suitable purpose.

SUMMARY

A control system includes a shift detection module, a request generation module, and a request setting module. The shift detection module detects when a transmission is executing a shift. The request generation module generates a transmission torque request to cause an engine to increase a transmission input shaft speed to a desired speed at a desired gear ratio when the transmission is executing the shift. The request setting module selectively sets the transmission torque request equal to a default torque request when the transmission torque request is greater than a first torque and the engine is coupled to a drive wheel.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
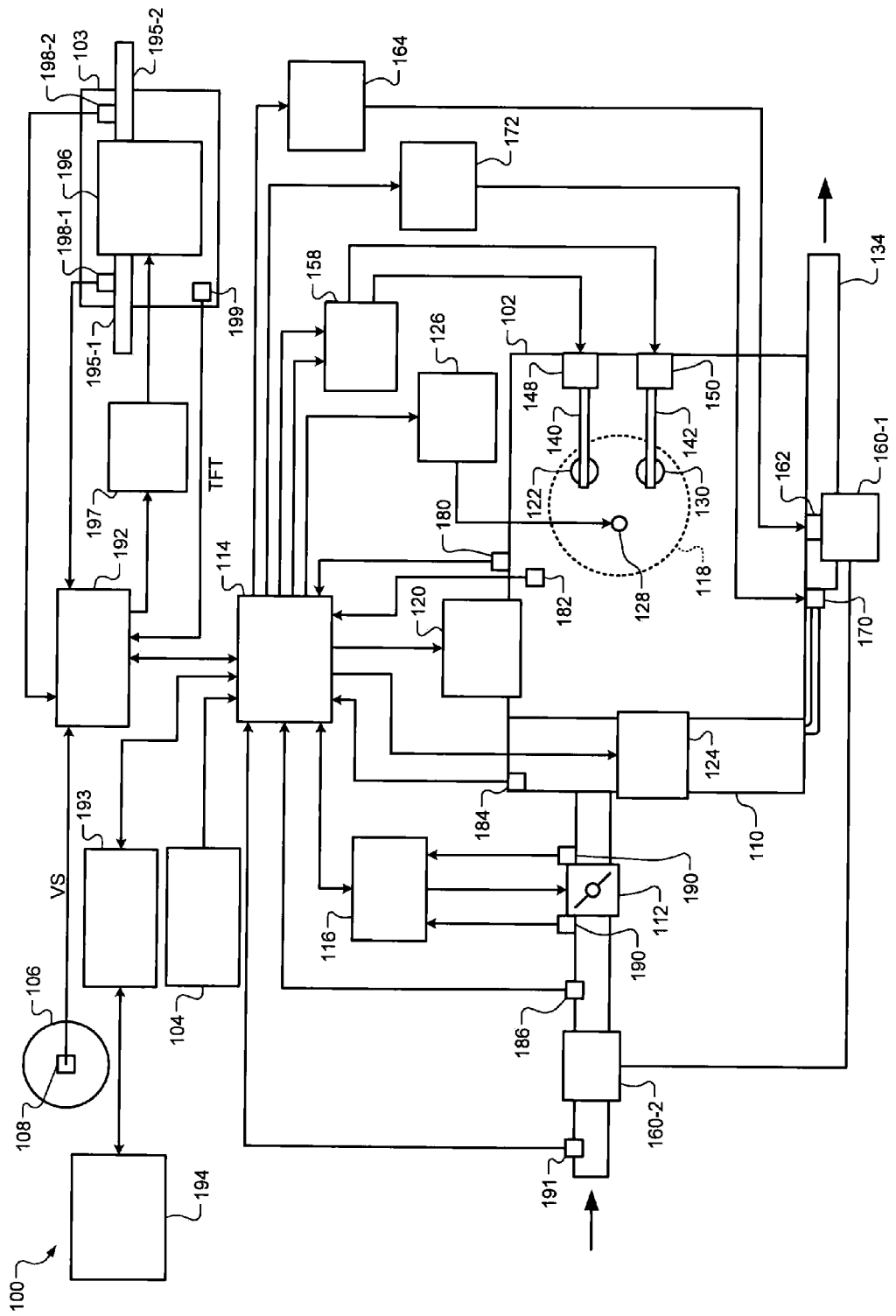
FIG. 1 is a functional block diagram of an example of a powertrain system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

During a downshift of a transmission, the speed of an input shaft is increased to achieve a desired speed at a desired gear ratio. The input shaft speed may be increased by partially applying an oncoming clutch to couple the input shaft with an output shaft. This technique uses vehicle inertia to increase the input shaft speed, which may result in a vehicle deceleration and may degrade shift feel. This may cause the driver to perceive that a vehicle is slowing down when acceleration is requested. This perception may be referred to as a torque hole, a torque sag, or a hesitation in acceleration.

A powertrain control system according to the principles of the present disclosure generates a transmission torque request during a shift and controls a powertrain, including an engine and/or an electric motor, to produce a positive torque based on the transmission torque request. A positive torque is a torque that causes the vehicle to move forward when the powertrain is coupled to one or more drive wheels. When the powertrain is uncoupled from the drive wheels, a positive torque may be used to increase the input shaft speed to the desired speed at the desired gear ratio. This increases the input shaft speed faster than partially applying the oncoming clutch, which enables the oncoming clutch to be fully applied sooner and decreases the time required for the shift. Increasing the input shaft speed in this way also improves shift feel by, for example, avoiding a torque hole.

A powertrain control system according to the principles of the present disclosure performs various checks before controlling the powertrain based on the transmission torque request. The transmission torque request is stored and write-protected in at least two memory locations and cross-checked upon retrieval. The transmission torque request is secured by, for example, verifying that the transmission torque request is less than a threshold level when the powertrain is coupled to the drive wheels. The timing and order of operations performed to generate and secure the transmission torque request are analyzed. If the transmission torque request does not pass one of these various checks, then the powertrain is not controlled based on the transmission torque request. In this manner, transmission torque requests resulting in unintended acceleration are prevented.

In addition, the various checks described in the preceding paragraph may be performed within a transmission control module that is separate from other modules such as an engine control module or a hybrid control module. In this regard, the transmission control module may be a stand-alone device capable of ensuring that torque requests generated in the transmission control module will not result in unintended acceleration. In turn, coordination between the transmission control module and other modules regarding this function may be unnecessary or at least simplified significantly.

Referring now to FIG. 1, a functional block diagram of an exemplary powertrain system 100 is presented. The powertrain system 100 includes an engine 102 and a transmission 103. The engine 102 combusts an air/fuel mixture to produce drive torque for a vehicle based on driver input from a driver input module 104. The transmission 103 transfers the drive torque to a drive wheel 106 to accelerate the vehicle. Although only one drive wheel 106 is shown, the vehicle may include more drive wheels. A wheel speed sensor 108 may detect a wheel speed, such as a rotational speed of the drive wheel 106.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110. The ECM 114 may determine the vehicle speed based on the wheel speed received from the wheel speed sensor 108.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The powertrain system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The powertrain system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The powertrain system 100 may measure an engine speed, or the speed of the crankshaft, using an engine speed (ES) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 191. The ECM 114 may use signals from the sensors to make control decisions for the powertrain system 100.

The ECM 114 may communicate with a transmission control module (TCM) 192 to coordinate shifting gears in the transmission 103. For example, the ECM 114 may reduce or increase engine torque during a gear shift. In various implementations, various functions of the ECM 114 and the TCM 192 may be integrated into one or more modules. The ECM 114 may communicate with a hybrid control module (HCM) 193 to coordinate operation of the engine 102, the transmission 103, and an electric motor 194. For example, the ECM 114 may instruct the HCM 193 to reduce or increase electric motor torque during a gear shift.

The electric motor 194 may be powered by a fuel cell. The electric motor 194 may also function as a generator, and may be used to produce electrical energy for use by vehicle electrical systems and/or for storage in a battery. In various implementations, various functions of the ECM 114, the TCM 192, and the HCM 193 may be integrated into one or more modules.

The transmission 103 includes an input shaft 195-1, an output shaft 195-2, and a gearbox 196 coupling the shafts 195-1, 195-2. A clutch actuator module 197 actuates clutches in the gearbox 196 to transfer torque from the input shaft 195-1 to the output shaft 195-2 at a desired gear ratio. The TCM 192 may monitor rotational speeds of the shafts 195-1, 195-2 using a transmission input shaft speed (TISS) sensor 198-1 and a transmission output shaft speed (TOSS) sensor 198-2. The TCM 192 may monitor a transmission fluid temperature using a transmission fluid temperature (TFT) sensor 199.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
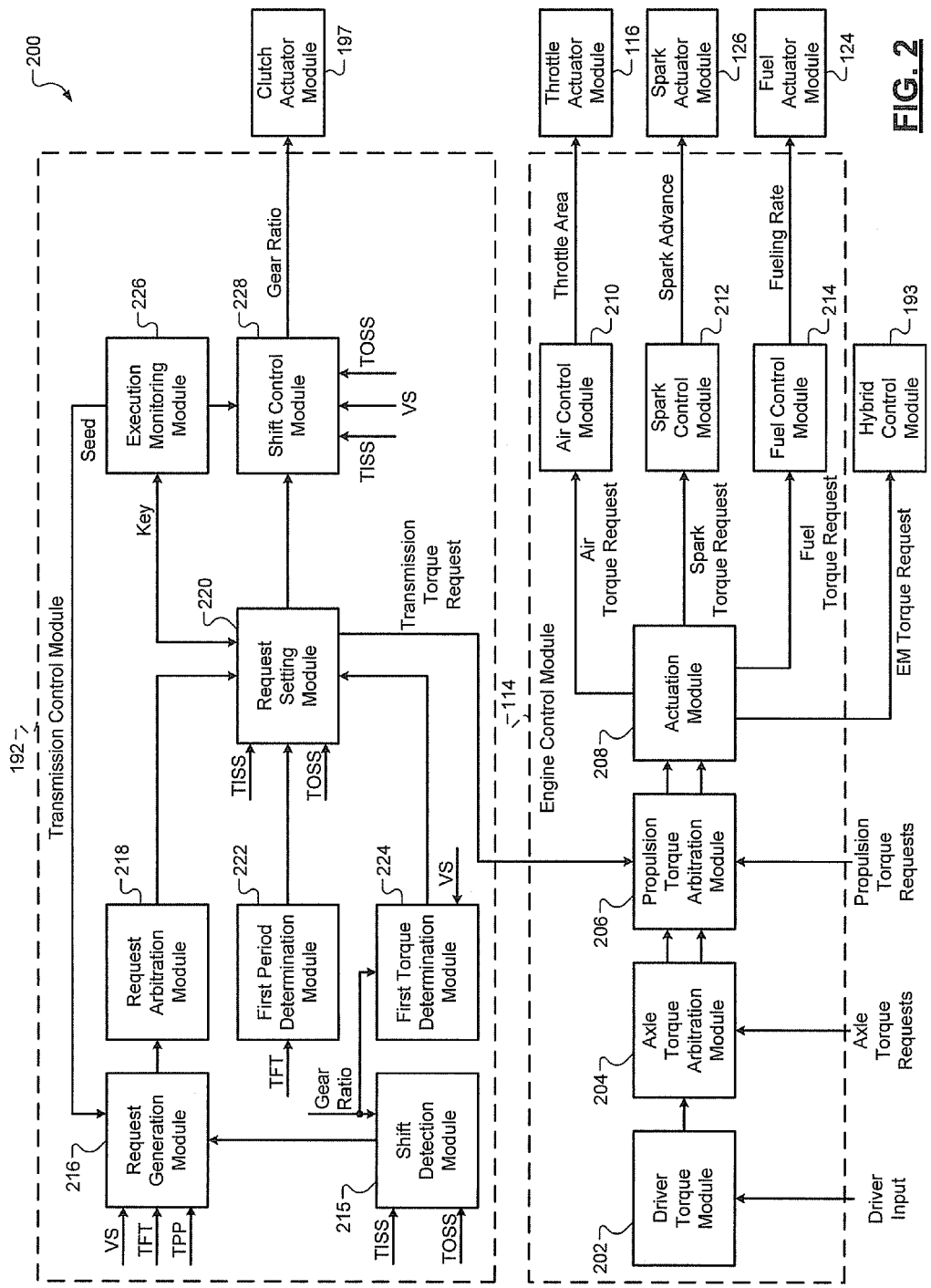
FIG. 2 is a functional block diagram of an example of a powertrain control system according to the principles of the present disclosure.

Referring now to FIG. 2, a powertrain control system 200 may include the ECM 114, the TCM 192, and the HCM 193. The ECM 114 includes a driver torque module 202. The driver torque module 202 may determine a driver torque request based on driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings.

An axle torque arbitration module 204 arbitrates between the driver torque request from the driver torque module 202 and other axle torque requests. Axle torque (torque at the wheels) may be produced by various sources including an engine and/or an electric motor. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips in the other direction with respect to the road surface because the axle torque is negative.

Axle torque requests may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may be converted into and arbitrated with propulsion torque requests before being used to control actuators of the powertrain system 100.

In general terms, the immediate torque request is the amount of currently desired axle torque, while the predicted torque request is the amount of axle torque that may be needed on short notice. The ECM 114 therefore controls the powertrain system 100 to produce an axle torque equal to the immediate torque request. However, different combinations of actuator values may result in the same axle torque. The ECM 114 may therefore adjust the actuator values to allow a faster transition to the predicted torque request, while still maintaining the axle torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the powertrain system 100 to the immediate torque request. However, the ECM 114 controls the powertrain system 100 so that the powertrain system 100 can quickly resume producing the predicted torque request once the wheel slip stops.

In general terms, the difference between the immediate torque request and the higher predicted torque request can be referred to as a torque reserve. The torque reserve may represent the amount of additional torque that the powertrain system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request is within the range, fast engine actuators can be set to cause the axle torque to be equal to the immediate torque request. When the ECM 114 requests the predicted torque request to be output, the fast engine actuators can be controlled to vary the axle torque to the top of the range, which is the predicted torque request.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the powertrain system 100 to produce the predicted torque request if the fast actuators were set to appropriate values. Meanwhile, the ECM 114 may set actuator values for fast actuators to values that, given the slow actuator values, cause the powertrain system 100 to produce the immediate torque request instead of the predicted torque request.

The fast actuator values therefore cause the powertrain system 100 to produce the immediate torque request. When the ECM 114 decides to transition the axle torque from the immediate torque request to the predicted torque request, the ECM 114 changes the actuator values for one or more fast actuators to values that correspond to the predicted torque request. Because the slow actuator values have already been set based on the predicted torque request, the powertrain system 100 is able to produce the predicted torque request after only the delay imposed by the fast actuators. In other words, the longer delay that would otherwise result from changing axle torque using slow actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request. The resulting torque reserve can absorb sudden increases in required axle torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in the throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

When the engine 102 is a compression-ignition engine, the fuel actuator module 124 may be a fast actuator and the throttle actuator module 116 may be an emissions actuators. In this manner, the fuel mass may be set based on the immediate torque request, and the throttle opening area may be set based on the predicted torque request. The throttle opening area may generate more air flow than necessary to satisfy the predicted torque request. In turn, the air flow generated may be more than the amount required for complete combustion of the injected fuel such that the air/fuel ratio is usually lean and changes in air flow do not affect the engine output torque. The engine output torque will therefore be equal to the immediate torque request and may be increased or decreased by adjusting the fuel flow.

The throttle actuator module 116 may be controlled based on the predicted torque request to control emissions and to minimize turbo lag. The throttle actuator module 116 may create a vacuum to draw exhaust gases through the EGR valve 170 and into the intake manifold 110.

The axle torque arbitration module 204 may output the predicted torque request and the immediate torque request to a propulsion torque arbitration module 206. The predicted and immediate torque requests received by the propulsion torque arbitration module 206 are converted from an axle torque domain (torque at the wheels) into a propulsion torque domain (torque at the crankshaft).

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests. The propulsion torque arbitration module 206 outputs the arbitrated predicted and immediate torque requests to an actuation module 208.

Other propulsion torque requests may include torque reductions for engine over-speed protection, torque increases for stall prevention, and a transmission torque request generated by the transmission control module 192 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The actuation module 208 receives the arbitrated predicted and immediate torque requests from the propulsion torque arbitration module 206. The actuation module 208 determines how the arbitrated predicted and immediate torque requests will be achieved. The actuation module 208 may be engine type specific. For example, the actuation module 208 may be implemented differently or use different control schemes for spark-ignition engines versus compression-ignition engines.

In various implementations, the actuation module 208 may define a boundary between modules that are common across all engine types and modules that are engine type specific. For example, engine types may include spark-ignition and compression-ignition. Modules prior to the actuation module 208, such as the propulsion torque arbitration module 206, may be common across engine types, while the actuation module 208 and subsequent modules may be engine type specific.

For example, in a spark-ignition engine, the actuation module 208 may vary the opening of the throttle valve 112 as a slow actuator that allows for a wide range of torque control. The actuation module 208 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 208 may generate an air torque request based on the arbitrated predicted torque request. The air torque request may be equal to the arbitrated predicted torque request, setting air flow so that the arbitrated predicted torque request can be achieved by changes to other actuators.

An air control module 210 may determine desired actuator values based on the air torque request. For example, the air control module 210 may control a desired throttle area based on the air torque request. In various implementations, the air control module 210 may also determine desired manifold absolute pressure (MAP), desired air per cylinder (APC), and desired EGR valve opening (EVO). Desired MAP may be used to determine desired boost, and desired APC may be used to determine desired cam phaser positions.

The actuation module 208 may also generate a spark torque request and a fuel torque request. The spark torque request may be used by a spark control module 212 to determine how much to retard the spark timing (which reduces engine output torque) from a calibrated spark advance.

A fuel control module 214 may vary the amount of fuel provided to each cylinder based on the fuel torque request from the actuation module 208. During normal operation of a spark-ignition engine, the fuel control module 214 may operate in an air lead mode in which the fuel control module 214 attempts to maintain a stoichiometric air/fuel ratio by controlling fuel flow based on air flow. The fuel control module 214 may determine a fuel mass that will yield stoichiometric combustion when combined with the current amount of air per cylinder. The fuel control module 214 may instruct the fuel actuator module 124 via the fueling rate to inject this fuel mass for each activated cylinder.

The actuation module 208 may also generate an electric motor (EM) torque request. The HCM 193 may control the output torque of the electric motor 194 based on the EM torque request.

In compression-ignition systems, the fuel control module 214 may operate in a fuel lead mode in which the fuel control module 214 determines a fuel mass for each cylinder that satisfies the fuel torque request while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

A mode setting may determine how the actuation module 208 treats the arbitrated immediate torque request. The mode setting may be provided to the actuation module 208, such as by the propulsion torque arbitration module 206, and may select modes including an inactive mode, a pleasible mode, a maximum range mode, and an auto actuation mode.

In the inactive mode, the actuation module 208 may ignore the arbitrated immediate torque request and set engine output torque based on the arbitrated predicted torque request. The actuation module 208 may therefore set the spark torque request and the fuel torque request to the arbitrated predicted torque request, which maximizes engine output torque for the current engine air flow conditions. Alternatively, the actuation module 208 may set these requests to predetermined (such as out-of-range high) values to disable torque reductions from retarding spark, deactivating cylinders, or reducing the fuel/air ratio.

In the pleasible mode, the actuation module 208 outputs the arbitrated predicted torque request as the air torque request and attempts to achieve the arbitrated immediate torque request by adjusting only spark advance. The actuation module 208 therefore outputs the arbitrated immediate torque request as the spark torque request. The spark control module 212 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the arbitrated immediate torque request.

In the maximum range mode, the actuation module 208 may output the arbitrated predicted torque request as the air torque request and the arbitrated immediate torque request as the spark torque request. In addition, the actuation module 208 may send a cylinder shut-off torque request to the cylinder actuator module 120 (thereby deactivating cylinders) when reducing spark advance alone is unable to achieve the arbitrated immediate torque request.

In the auto actuation mode, the actuation module 208 may decrease the air torque request based on the arbitrated immediate torque request. In various implementations, the air torque request may be reduced only so far as is necessary to allow the spark control module 212 to achieve the arbitrated immediate torque request by adjusting spark advance. Therefore, in auto actuation mode, the arbitrated immediate torque request is achieved while adjusting the air torque request as little as possible. In other words, the use of relatively slowly-responding throttle valve opening is minimized by reducing the quickly-responding spark advance as much as possible. This allows the engine 102 to return to producing the arbitrated predicted torque request as quickly as possible.

The TCM 192 includes a shift detection module 215 and a request generation module 216. The shift detection module 215 detects when the transmission 103 is executing a shift. The shift detection module 215 may detect this based on a control signal sent from the TCM 192 to the transmission 103, a transmission input shaft speed, and/or a transmission output shaft speed. The control signal may indicate a desired gear ratio.

The request generation module 216 generates an immediate transmission torque request and a predicted transmission torque request. The request generation module 216 may generate the immediate and predicted transmission torque requests based on a vehicle speed, a transmission fluid temperature, and a transmission pump pressure. For example, the request generation module 216 may generate positive torque requests when an increase in the transmission pump pressure is desired to apply an oncoming clutch and thereby complete a shift. The request generation module 216 outputs the immediate and predicted transmission torque requests to a request arbitration module 218.

The immediate and predicted transmission torque requests may be negative during an upshift, when a decrease in the transmission input shaft speed is desired to synchronize the transmission input and output shaft speeds. The immediate and predicted transmission torque requests may be positive during a downshift, when an increase in the transmission input shaft speed is desired to synchronize the transmission input and output shaft speeds.

The immediate and predicted transmission torque requests may be specified as minimum or maximum torque requests. For example, the predicted transmission torque request may be a minimum torque request of 200 Newton-meters (Nm). In this case, a powertrain output torque of 200 Nm or greater would satisfy the predicted transmission torque request.

The request arbitration module 218 arbitrates between the immediate and predicted transmission torque requests to select a single transmission torque request. The request arbitration module 218 may select a maximum of the immediate and predicted transmission torque requests. For example, the immediate and predicted transmission torque requests may be 400 Nm and 200 Nm minimums, respectively. In this case, the request arbitration module 218 may select the immediate transmission torque request as the transmission torque request. The request arbitration module 218 outputs the transmission torque request to a request setting module 220. The request arbitration module 218 may store and write-protect the transmission torque request in two or more memory locations and in different storage formats.

In various implementations, the request generation module 216 may generate a single transmission torque request and the request arbitration module 218 may be omitted. The request generation module 216 may store and write-protect the transmission torque request in two or more memory locations.

The TCM 192 also includes a first period determination module 222 and a first torque determination module 224. The first torque determination module 224 determines a first torque. The first torque may be a minimum amount of torque required to achieve a maximum allowable acceleration, such as 0.3 g within 0.4 seconds. The first torque may be calculated based on optimum conditions for vehicle acceleration, such as dry pavement and traveling down a hill. The first torque determination module 224 may determine the first torque based on a gear ratio and a vehicle speed. The first torque determination module 224 may also determine the first torque based on predetermined factors, such as a vehicle mass and a wheel diameter. The first torque determination module 224 outputs the first torque to the request setting module 220.

The first period determination module 222 determines a first period. The first period may be a maximum amount of time for which the transmission torque request is allowed to be greater than the first torque while a power flow is connected. The power flow is connected when a powertrain is coupled to one or more drive wheels. The first period determination module 222 may determine the first period based on a transmission fluid temperature. The first period may be inversely related to the transmission fluid temperature. For example, the first period may be 50 milliseconds (ms) when the transmission fluid temperature is 185 degrees Celsius (° C.) and 500 ms when the transmission fluid temperature is −45° C. The first period determination module 222 outputs the first period to the request setting module 220.

The request setting module 220 retrieves transmission torque requests stored in the two or more memory locations in different formats and verifies that stored requests are equal. For example, the transmission torque requests may be stored in a first location using a first binary format (e.g., 010) and stored in a second location using a second binary format (e.g., 101) that is an inversion of the first binary format. In turn, the request setting module 220 may verify that the values retrieved from the first location and the second location are binary inversions of each other and represent the same torque request value. This protects against a memory failure, which may cause the values stored in the first location and/or the second location to be reset to 0 or 1.

The request setting module 220 modifies the transmission torque request when the stored requests are different or when certain conditions are satisfied, as discussed in more detail below with reference to FIG. 3. The request setting module 220 may modify the transmission torque request by setting the transmission torque request equal to a default torque request. The default torque request may include a value and a mode that instruct the ECM 114 to ignore the transmission torque request. For example, the ECM 114 may ignore the transmission torque request when the transmission torque request specifies a value of −4096 Nm and/or a nonintervention mode. The request setting module 220 outputs the transmission torque request to the propulsion torque arbitration module 206 of the ECM 114.

The request setting module 220 may also send outputs to an execution monitoring module 226 and a shift control module 228. The execution monitoring module 226 may verify that the transmission torque request is generated and secured according to a predetermined order and predetermined timing. To do this, the execution monitoring module 226 may output a seed (i.e., a randomly selected number) to the request generation module 216. The request generation module 216 may perform a first operation using the seed and a first predetermined number, and then output a first answer to the request arbitration module 218.

The request arbitration module 218 may relay the first answer to the request setting module 220. The request setting module 220 may perform a second operation using the first answer and a second predetermined number, and then output a second answer or key to the execution monitoring module 226. The execution monitoring module 226 may determine that the predetermined timing is satisfied when the period between sending the seed and receiving the key is equal to a predetermined period. The execution monitoring module 226 may determine that the predetermined order is satisfied when the key is equal to a predetermined answer that corresponds to the seed. The execution monitoring module 226 may instruct the request setting module 220 to set the transmission torque request equal to the default torque request when the predetermined timing and the predetermined order are not satisfied.

The first operation and the second operation may include one or more mathematical or logical operations, including but not limited to multiplication, exclusive or, and/or shift, that produce a different answer depending on the order in which the operations are performed. For example, the first operation may be addition and the second operation may be multiplication. In this case, the key will be equal to the predetermined answer if the seed is added to the first predetermined number and the first answer is multiplied by the second predetermined number. However, if the seed is multiplied by the first predetermined number and the first answer is added to the second predetermined number, the key will not be equal to the predetermined answer.

The execution monitoring module 226 may send a seed or an answer to other modules in the TCM 192 and a key may be produced as a result of math operations performed in the other modules. For example, the request arbitration module 218 may perform math operations using an answer received from the request generation module 216 and output a second answer to the request setting module 220. The request setting module 220 may then produce a key based on the second answer. The execution monitoring module 226 may be separate from modules receiving a seed, receiving an answer, and/or sending a key so that the execution monitoring module 226 functions independent from those modules.

The execution monitoring module 226 may send a seed each time that a transmission torque request is generated. For example, the request generation module 216 may generate a transmission torque request every 12 ms, and the execution monitoring module 226 may send a seed every 12 ms. In this manner, the execution monitoring module 226 may verify that each transmission torque request is generated and secured according to the predetermined timing and the predetermined order.

The shift control module 228 determines a desired gear ratio for a transmission. The shift control module 228 may determine the desired gear ratio based on a transmission input shaft speed, a transmission output shaft speed, and a vehicle speed. The shift control module 228 may receive inputs from the execution monitoring module 226 indicating whether the transmission torque request is generated and secured according to the predetermined timing and order. The shift control module 228 may operate a transmission in a default mode when the transmission torque request is not generated and secured according to the predetermined timing and order.

The shift control module 228 may operate a transmission in a default mode by reducing the number of gear ratios that a driver may select. For example, operating a transmission in the default mode may include limiting the selectable gear ratios to park, reverse, neutral, and a single drive gear ratio. Alternatively, operating a transmission in the default mode may include limiting the selectable gear ratios to neutral, removing the ability of the powertrain control system 200 to move the vehicle by providing drive torque to the drive wheel 106.

Figure 3:
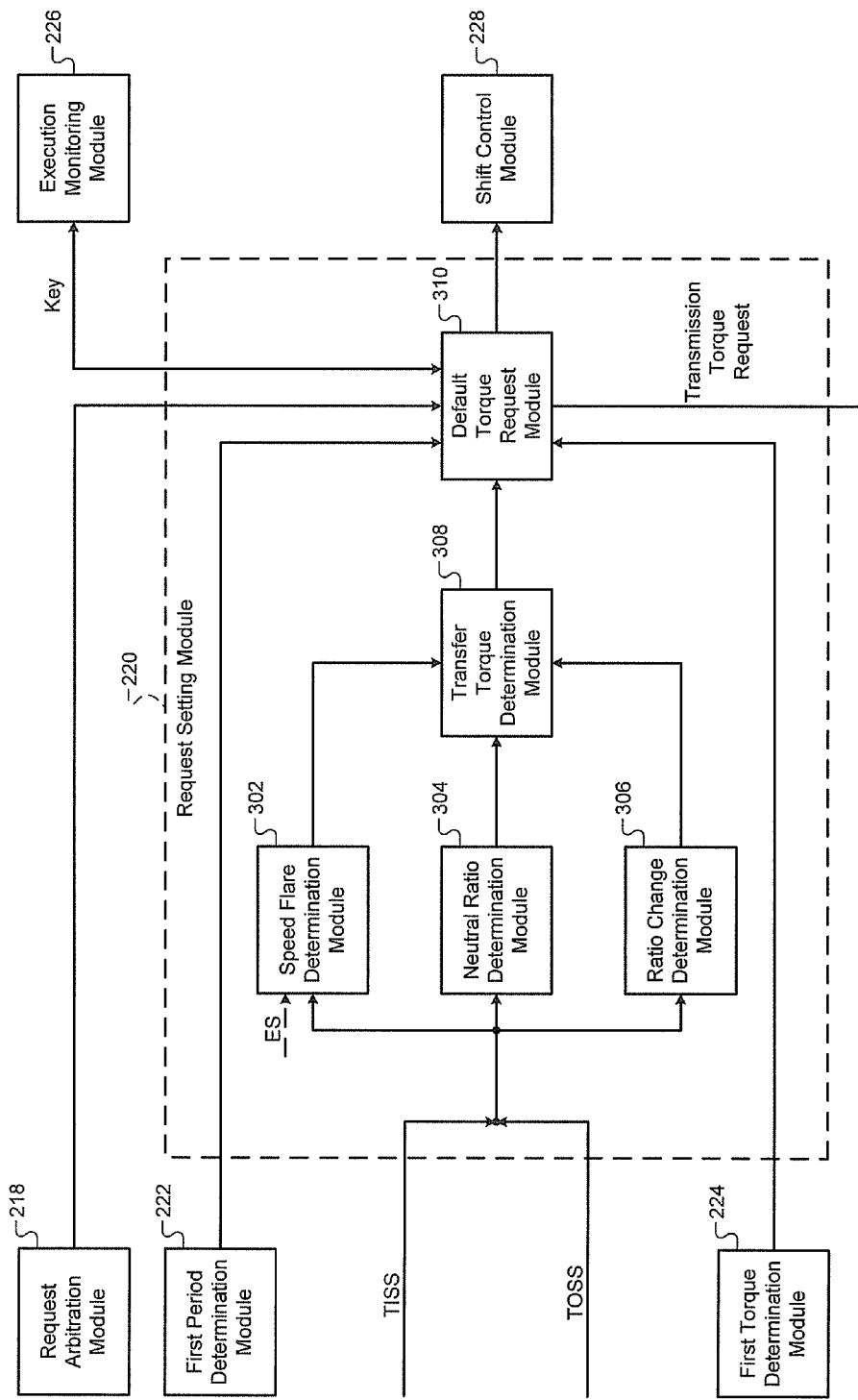
FIG. 3 is a functional block diagram of an example of control modules and signals according to the principles of the present disclosure.

Referring now to FIG. 3, the request setting module 220 includes a speed flare determination module 302, a neutral ratio determination module 304, and a ratio change determination module 306. The speed flare determination module 302, the neutral ratio determination module 304, and the ratio change determination module 306 determine whether conditions exist and send determinations to a transfer torque determination module 308.

The speed flare determination module 302 determines whether an engine speed is flaring. The speed flare determination module 302 may determine that the engine speed is flaring when a rate of change in a transmission input shaft speed is greater than a first threshold speed rate, such as 1000 revolution per minute per second (RPM/s). Alternatively, the speed flare determination module 302 may receive an engine speed and may determine that the engine speed is flaring when a rate of change in the engine speed is greater than a second threshold speed rate.

The neutral ratio determination module 304 determines when a transmission is in neutral. The neutral ratio determination module 304 may determine whether the transmission is in neutral based on the transmission input shaft speed and a transmission output shaft speed. The neutral ratio determination module 304 may determine that the transmission is in neutral when a ratio of the transmission input shaft speed to the transmission output shaft speed is greater than a predetermined ratio. The predetermined ratio may correspond to the highest gear ratio in the transmission, such as six to one.

The ratio change determination module 306 determines whether a transmission is shifting gear ratios. The ratio change determination module 306 may determine whether the transmission is shifting based on the transmission input shaft speed and the transmission output shaft speed. The ratio change determination module 306 may determine that the transmission is shifting when a rate of change in a ratio of the transmission input shaft speed to the transmission output shaft speed is greater than a predetermined ratio rate. For example, the predetermined ratio rate may be one-tenth of a ratio change per second and may have units of RPM/RPM/s.

The transfer torque determination module 308 determines whether the power flow is connected. The transfer torque determination module 308 may determine that the power flow is not connected when the engine speed is flaring, the transmission is in neutral, or the transmission is shifting gear ratios. The transfer torque determination module 308 may make this determination based on inputs received from the speed flare determination module 302, the neutral ratio determination module 304, and the ratio change determination module 306. The transfer torque determination module 308 outputs this determination to a default torque request module 310.

The default torque request module 310 receives inputs from the request arbitration module 218, the first period determination module 222, the first torque determination module 224, and the transfer torque determination module 308. The default torque request module 310 selectively modifies the transmission torque request by setting the transmission torque request equal to the default torque request based on the inputs received. The default torque request module 310 may modify the transmission torque request when the transmission torque request is positive for a predetermined period. The predetermined period may be a maximum shift period, such as four seconds.

The default torque request module 310 may modify the transmission torque request when, for the first period, the transmission torque request is greater than the first torque and the power flow is connected. The default torque request module 310 outputs the transmission torque request to the propulsion torque arbitration module 206 of FIG. 2.

Figure 4:
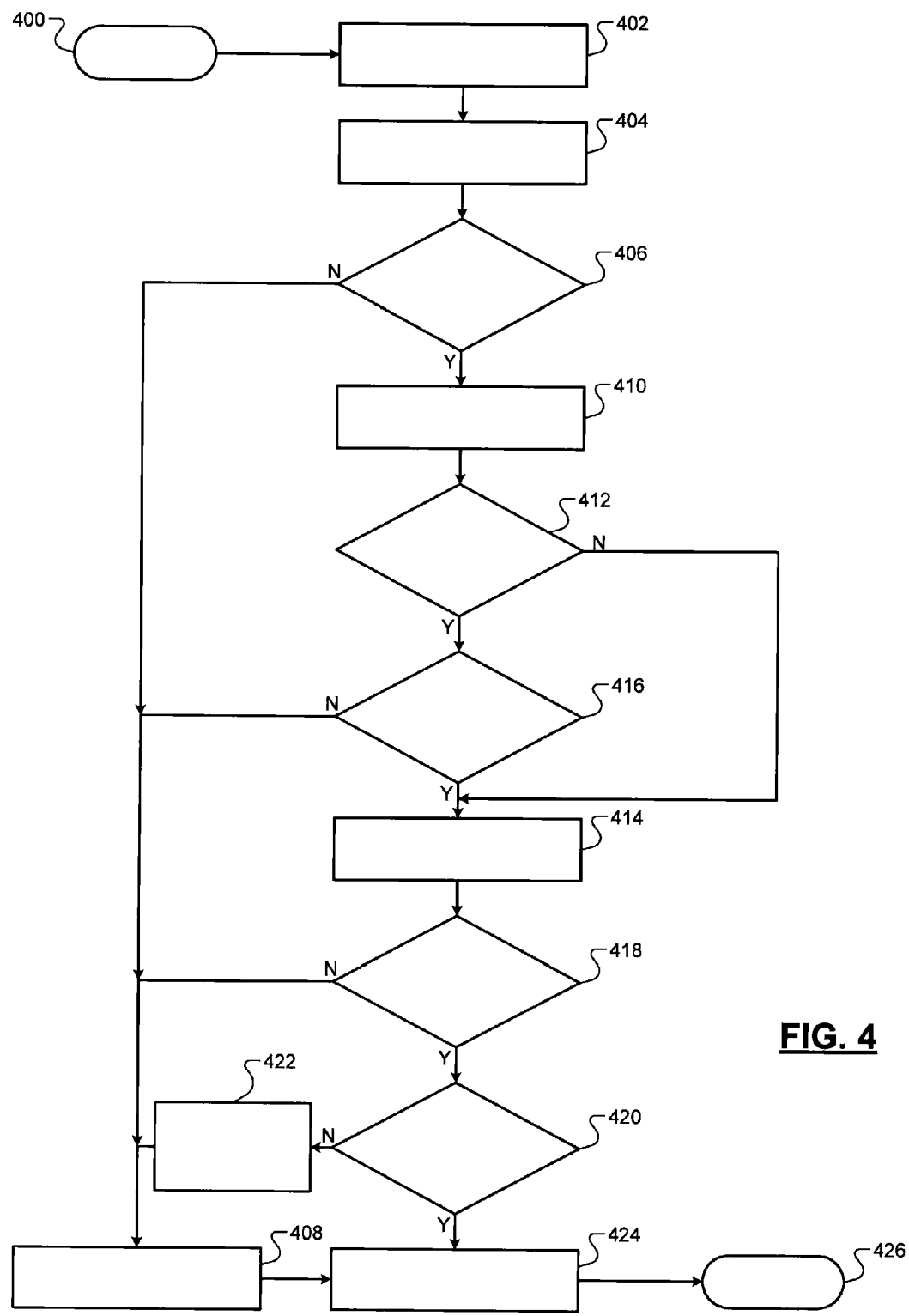
FIG. 4 illustrates a method of controlling a powertrain system during a transmission shift according to the principles of the present disclosure.

Referring now to FIG. 4, a method is illustrated for generating a transmission torque request, securing the transmission torque request, and verifying that the transmission torque request is generated and secured properly. A positive torque may be requested during a shift to increase an input shaft speed and thereby improve the shift speed and feel. The method starts at 400. At 402, the method generates the transmission torque request. The method may generate the transmission torque request based on a vehicle speed, a transmission fluid temperature, and a transmission pump pressure.

At 404, the method stores and write-protects the transmission torque request in two or more memory locations in different formats. At 406, the method determines whether the transmission torque request is positive for a predetermined period. The predetermined period may be a maximum shift period, such as four seconds.

If 406 is false, the method continues at 408 and sets the transmission torque request equal to a default torque request. The default torque request may include instructions to ignore the transmission torque request when determining a desired powertrain output torque. The instructions may be in the form of a value and a mode. The value and the mode may each instruct ignoring the transmission torque request to ensure that the transmission torque request is ignored even when one of the value or the mode is not interpreted correctly.

If 406 is true, the method continues at 410 and determines a first period. The first period may be a maximum amount of time for which the transmission torque request is allowed to be greater than a first torque while a power flow is connected. The first torque may be a minimum amount of torque required to achieve a maximum allowable acceleration, such as 0.3 g within 0.4 seconds. The power flow is connected when a powertrain is coupled to one or more drive wheels.

The first period may be determined based on the transmission fluid temperature. The first period may be inversely related to the transmission fluid temperature. For example, the first period may be 50 milliseconds (ms) when the transmission fluid temperature is 185 degrees Celsius (° C.) and may be 500 ms when the transmission fluid temperature is −45° C.

At 412, the method determines whether the transmission torque request has been greater than the first torque for the first period. If 412 is false, the method continues at 414 and retrieves the transmission torque request from the memory locations in which the transmission torque request was stored and write-protected.

If 412 is true, the method continues at 416 and determines whether the power flow has been disconnected for the first period. If 416 is false, the method continues at 408 and sets the transmission torque request equal to the default torque request. If 416 is true, the method continues at 414 and retrieves the transmission torque request from the memory locations in which the transmission torque request was stored and write-protected.

At 418, the method determines whether the retrieved requests are equal. The retrieved requests may be equal when both a value and a mode of the retrieved requests are identical. If 418 is false, the method continues at 408 and sets the transmission torque request equal to the default torque request.

If 418 is true, the method continues at 420 and determines whether operations for generating and securing the transmission torque request were executed according to a predetermined order and predetermined timing. The method may verify the execution timing and order using a seed and a key in the manner described above with reference to FIG. 3.

If 420 is false, the method continues at 422 and operates a transmission in a default mode. Operating the transmission in the default mode may include reducing a number of selectable gear ratios of the transmission. If 420 is true, the method continues at 424 and transmits the transmission torque request to an engine control module (ECM) and/or a hybrid control module (HCM). When the transmission torque request has been set to the default torque request, the ECM and the HCM may refrain from controlling an engine and an electric motor, respectively, based on the transmission torque request. Otherwise, the ECM and the HCM may control the engine and the electric motor based on the transmission torque request. The method ends at 426.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
a shift detection module that detects when a transmission is executing a shift;
a request generation module that generates a transmission torque request to cause an engine to increase a transmission input shaft speed to a desired speed at a desired gear ratio when the transmission is executing the shift; and
a request setting module that selectively sets the transmission torque request equal to a default torque request when the transmission torque request is greater than a first torque and the engine is coupled to a drive wheel.

2. The control system of claim 1, wherein the default torque request includes instructions to refrain from controlling the engine based on the default torque request.

3. The control system of claim 1, wherein the request generation module stores and write-protects the transmission torque request in at least two memory locations and the request setting module retrieves stored requests from the at least two memory locations and verifies that the stored requests are equal.

4. The control system of claim 3, wherein the request setting module sets the transmission torque request equal to the default torque request when the stored requests are different.

5. The control system of claim 1, further comprising a first period determination module that determines a first period based on a transmission fluid temperature, wherein the request setting module sets the transmission torque request equal to the default torque request when, for the first period, the transmission torque request is greater than the first torque and the engine is coupled to the drive wheel.

6. The control system of claim 5, wherein the request setting module sets the transmission torque request equal to the default torque request when the transmission torque request is positive for a predetermined period.

7. The control system of claim 1, further comprising a transfer torque determination module that determines whether the engine is coupled to the drive wheel based on when an engine speed flares, when the transmission is in neutral, and when the transmission is shifting.

8. The control system of claim 7, further comprising:
a speed flare determination module that determines whether the engine speed is flaring based on the transmission input shaft speed;
a neutral ratio determination module that determines whether the transmission is in neutral based on the transmission input shaft speed and a transmission output shaft speed; and
a ratio change determination module that determines whether the transmission is shifting based on the transmission input shaft speed and the transmission output shaft speed.

9. The control system of claim 1, further comprising an execution monitoring module that verifies that the transmission torque request is generated and secured according to a predetermined timing and a predetermined order, wherein securing the transmission torque request includes selectively setting the transmission torque request equal to the default torque request when the transmission torque request is greater than the first torque and the engine is coupled to the drive wheel.

10. The control system of claim 9, further comprising a shift control module that selectively operates the transmission in a default mode based on whether the transmission torque request is generated and secured according to the predetermined timing and the predetermined order.

11. A method, comprising:
   detecting when a transmission is executing a shift;
   generating a transmission torque request to cause an engine to increase a transmission input shaft speed to a desired speed at a desired gear ratio when the transmission is executing the shift; and
   selectively setting the transmission torque request equal to a default torque request when the transmission torque request is greater than a first torque and the engine is coupled to a drive wheel.

12. The method of claim 11, wherein the default torque request includes instructions to refrain from controlling the engine based on the default torque request.

13. The method of claim 11, further comprising storing and write-protecting the transmission torque request in at least two memory locations, retrieving stored requests from the at least two memory locations, and verifying that the stored requests are equal.

14. The method of claim 13, further comprising setting the transmission torque request equal to the default torque request when the stored requests are different.

15. The method of claim 11, further comprising determining a first period based on a transmission fluid temperature, and setting the transmission torque request equal to the default torque request when, for the first period, the transmission torque request is greater than the first torque and the engine is coupled to the drive wheel.

16. The method of claim 15, further comprising setting the transmission torque request equal to the default torque request when the transmission torque request is positive for a predetermined period.

17. The method of claim 11, further comprising determining whether the engine is couple to the drive wheel based on when an engine speed flares, when the transmission is in neutral, and when the transmission is shifting.

18. The method of claim 17, further comprising:
   determining whether the engine speed is flaring based on the transmission input shaft speed;
   determining whether the transmission is in neutral based on the transmission input shaft speed and a transmission output shaft speed; and
   determining whether the transmission is shifting based on the transmission input shaft speed and the transmission output shaft speed.

19. The method of claim 11, further comprising verifying that the transmission torque request is generated and secured according to a predetermined timing and a predetermined order, wherein securing the transmission torque request includes selectively setting the transmission torque request equal to the default torque request when the transmission torque request is greater than the first torque and the engine is coupled to the drive wheel.

20. The method of claim 19, further comprising selectively operating the transmission in a default mode based on whether the transmission torque request is generated and secured according to the predetermined timing and the predetermined order.

* * * * *